United States Patent
Kato

(10) Patent No.: US 6,773,382 B2
(45) Date of Patent: Aug. 10, 2004

(54) AUTOMATIC TOOL-EXCHANGING APPARATUS

(75) Inventor: Heizaburo Kato, Shizuoka (JP)

(73) Assignee: Sankyo Manufacturing Co., Ltd., Tokyo (JP)

( * ) Notice: Subject to any disclaimer, the term of this patent is extended or adjusted under 35 U.S.C. 154(b) by 46 days.

(21) Appl. No.: 10/310,213

(22) Filed: Dec. 5, 2002

(65) Prior Publication Data

US 2003/0114282 A1 Jun. 19, 2003

(30) Foreign Application Priority Data

Dec. 6, 2001 (JP) ........................................ 2001-372880

(51) Int. Cl.$^7$ ............................................. B23C 3/157
(52) U.S. Cl. ........................... 483/39; 483/38; 483/45; 483/49; 414/917; 414/744.6
(58) Field of Search ............................. 483/38–39, 45, 483/49, 60, 61, 66, 67, 40–41, 44, 36, 902; 414/917, 744.2, 744.6, 744.8

(56) References Cited

U.S. PATENT DOCUMENTS 5,281,194 A * 1/1994 Schneider .................... 483/14
5,620,406 A * 4/1997 Bae ............................. 483/39
6,679,131 B2 * 1/2004 Kato ............................. 74/53
2002/0035881 A1 * 3/2002 Kato ............................. 74/53
2002/0043126 A1 * 4/2002 Kato ............................ 74/567

FOREIGN PATENT DOCUMENTS

JP 11-099429 4/1999

* cited by examiner

Primary Examiner—Erica Cadugan
(74) Attorney, Agent, or Firm—Harness, Dickey & Pierce, P.L.C.

(57) ABSTRACT

An automatic tool-exchanging apparatus is provided which extends/contracts an arm with a rational and simple structure and can realize a high-speed operation essentially obtainable by making the arm's turning radius small. The apparatus comprises: an arm-driving shaft for being driven to rotate; an arm provided on the shaft and capable of being rotated, the arm capable of being moved to extend/contract and comprising a grip arm for attaching/detaching a tool, and an arm support movably supporting the grip arm; a clutch between the arm support and the shaft, the clutch for connecting the arm support and the shaft to make them rotate integrally, and disconnecting the arm support and the shaft to generate a relative rotation therebetween; and a link between the grip arm and the shaft, the link for transmitting the relative rotation of the shaft in respect to the arm support to make the grip arm move.

3 Claims, 13 Drawing Sheets

AUTOMATIC TOOL-EXCHANGING APPARATUS

CROSS-REFERENCE TO RELATED APPLICATIONS

The present application claims priority upon Japanese Patent Application No. 2001-372880 filed on Dec. 6, 2001, which is herein incorporated by reference.

BACKGROUND OF THE INVENTION

1. Field of the Invention

The present invention relates generally to an automatic tool-exchanging apparatus which can make an arm extend/contract with a rational and simple structure, and which can operate at a high speed that is essentially obtainable by making a turning radius small.

2. Description of the Related Art

An automatic tool-exchanging apparatus is configured to automatically exchange a tool placed in a waiting position, such as a tool magazine, and a tool placed in an exchange position, such as a main shaft of a machining center, by rotating an arm provided on an arm-driving shaft which is driven to rotate. There has been proposed a "tool exchange apparatus" (refer to Japanese Patent Application Laid-open Publication No. Hei 11-99429) where the arm may be extended outwardly from or contracted back in view of an arm-driving shaft which is the center of rotation in order so that the arm is extended when it grasps a tool, and the arm is shortened when it is rotated. Especially, since the turning radius of the arm can be shortened by contracting the arm at the time of rotation, the distance between the tool magazine and the main shaft can be shortened to save space. Further, rotational inertia of the arm may be made small to provide high-speed operation of the apparatus.

The above-mentioned apparatus is configured as below. A circularly-moving portion is attached to a tool-exchanging shaft which corresponds to an arm-driving shaft. A pair of circularly-moving shafts are attached to both ends of the circularly-moving portion so as to sandwich the tool-exchanging shaft. A rotating portion is attached to the circularly-moving shafts, respectively. Further, tool grippers are attached to the respective rotating portions via a rotating shaft. The circularly-moving portion is made to move circularly by the circular movement of the tool-exchanging shaft. According to this circular movement, the rotating portion is swung around the circularly-moving shaft in respect to the circularly-moving portion. Further, the tool gripper is swung around the rotating shaft in respect to the rotating portion. Thus, the entire length from the tool-exchanging shaft to the tool gripper can be extended and shortened. For transmission of rotational movements between the respective shafts, a gear mechanism is used.

Incidentally, in the above tool exchange apparatus, a series of sections which correspond to the arm has a complex structure comprised of a circularly-moving portion, a rotating portion, a tool gripper, a circularly-moving shaft and a rotating shaft which subsequently connect the above, and a gear mechanism which transmits rotational movement to the various members to swing and oscillate them. Further, the various members and gear mechanism are required to comprise sufficient rigidity so as to ensure operation when holding a tool having considerable weight. Accordingly, the portion corresponding to the arm is thought to bear a considerable weight.

If the portion corresponding to the arm has the above-mentioned considerable weight, a considerable power loss will occur when moving the members, i.e., the portions from the circularly-moving portion to the tool gripper. Further, even though the turning radius is made smaller by drawing-in the tool gripper at the time of rotational movement, due to the weight of the portion corresponding to the arm, the rotational inertia cannot be reduced to a small amount. Therefore, it is difficult to accurately stop and position the tool gripper in the waiting position and the exchange position, and also there is a problem that it is difficult to make the apparatus operate at high speed.

SUMMARY OF THE INVENTION

The present invention is made in view of the above and other problems, and its object is to provide an automatic tool-exchanging apparatus which can make an arm extend/contract with a rational and simple structure, and which may operate at a high speed that is essentially obtainable by making the turning radius small.

An automatic tool-exchanging apparatus according to one aspect of the present invention comprises: an arm-driving shaft capable of being driven to rotate; an arm provided on the arm-driving shaft and capable of being rotated, the arm capable of being moved to extend/contract, and comprising: a grip arm for attachably/detachably holding a tool, and an arm support movably supporting the grip arm; a clutch provided between the arm support and the arm-driving shaft, the clutch capable of connecting the arm support and the arm-driving shaft to make them rotate integrally, and disconnecting the arm support and the arm-driving shaft to generate a relative rotation therebetween; and a link provided between the grip arm and the arm-driving shaft, the link capable of transmitting the relative rotation of the arm-driving shaft in respect to the arm support to make the grip arm move.

Further, in the automatic tool-exchanging apparatus, the arm-driving shaft may be driven to rotate back and forth; the clutch may generate a back-and-forth relative rotation between the arm support and the arm-driving shaft; and the link may transmit the back-and-forth relative rotation to the grip arm to make the grip arm reciprocate.

Further, in the automatic tool-exchanging apparatus, the arm-driving shaft may be driven to reciprocate in the axial direction; the arm support may be made to detachably engage a stopper according to the reciprocation in the axial direction of the arm-driving shaft, the stopper prevents the rotation of the arm support; and the clutch may be disconnected when the arm support engages the stopper.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein.

PREFERRED EMBODIMENTS OF THE INVENTION

At least the following matters will be made clear by the explanation in the present specification and the description of the accompanying drawings.

Figure 1:
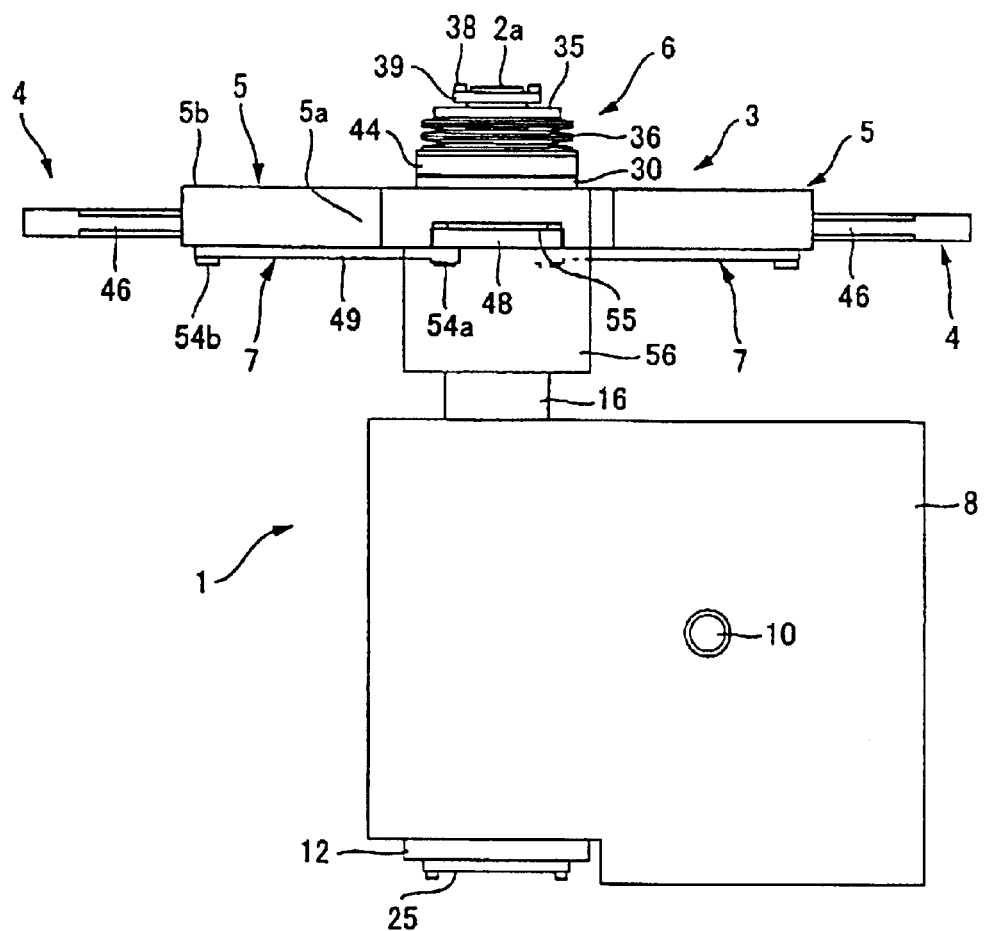
FIG. 1 is a side view showing a preferred embodiment of an automatic tool-exchanging apparatus according to the present invention.
Figure 2:
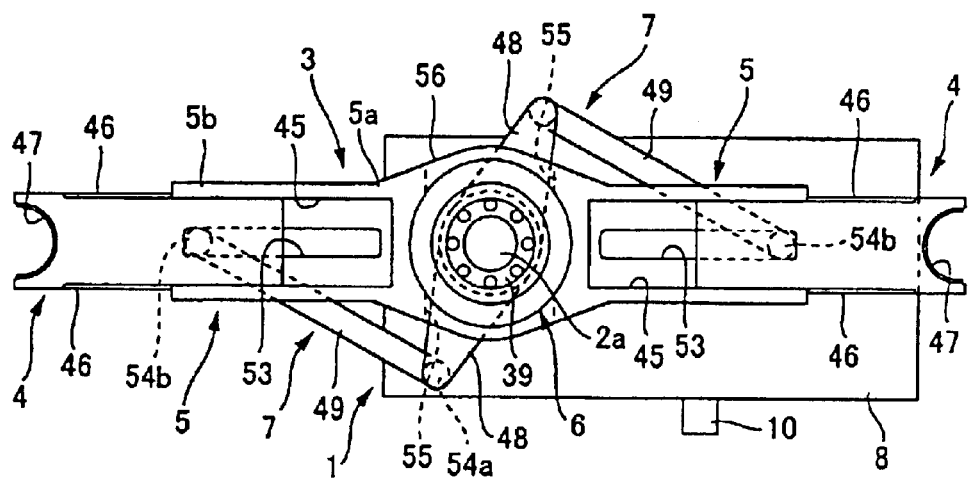
FIG. 2 is a plan view of the automatic tool-exchanging apparatus shown in FIG. 1.

Hereinbelow, a preferred embodiment of an automatic tool-exchanging apparatus according to the present invention is explained in detail with reference to the attached drawings. As shown in FIG. 1 and FIG. 2, the automatic tool-exchanging apparatus 1 according to this embodiment mainly makes an arm 3 move in an extending/contracting manner. This arm 3 is provided on a rotationally-driven arm-driving shaft 2 and is made to rotate. The apparatus 1 is structured as below. The arm 3 comprises grip arms 4 which can attachably/detachably hold tools, and an arm support 5 which movably supports the grip arms 4. In between the arm support 5 and the arm-driving shaft 2, there is provided a clutch 6. The clutch 6 integrally rotates both the arm support 5 and the arm-driving shaft 2 in a connected manner, and also, separates the arm support 5 and the arm-driving shaft 2 to make them relatively rotate. In between the grip arm 4 and the arm-driving shaft 2, there is provided a link 7 to transmit the relative rotation of the arm-driving shaft 2 in respect to the arm support 5 and to move the grip arm 4.

Figure 3:
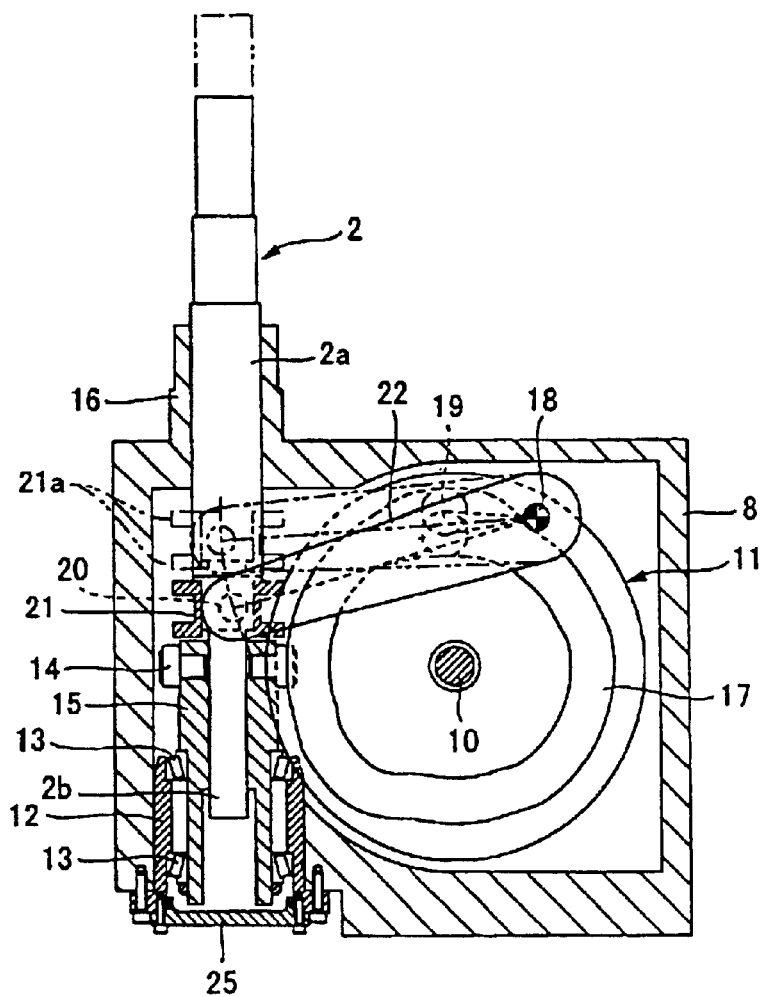
FIG. 3 is a side sectional view showing an example of a driving mechanism of an arm-driving shaft applied to the automatic tool-exchanging apparatus shown in FIG. 1.
Figure 4:
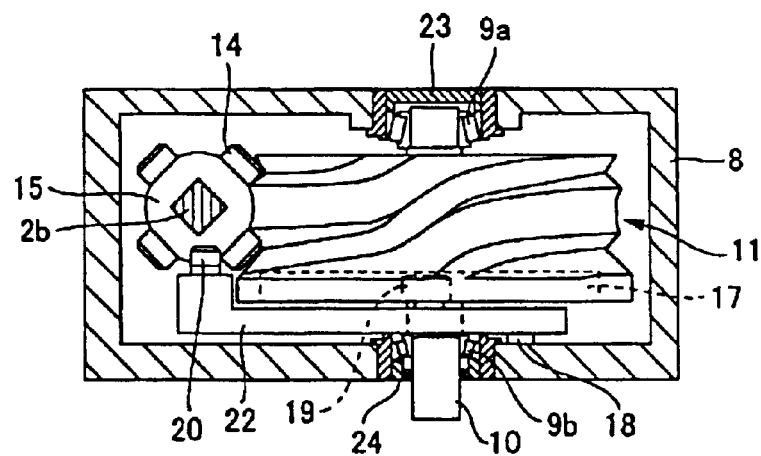
FIG. 4 is a plan sectional view of the driving mechanism of the arm-driving shaft shown in FIG. 3.
Figure 5:
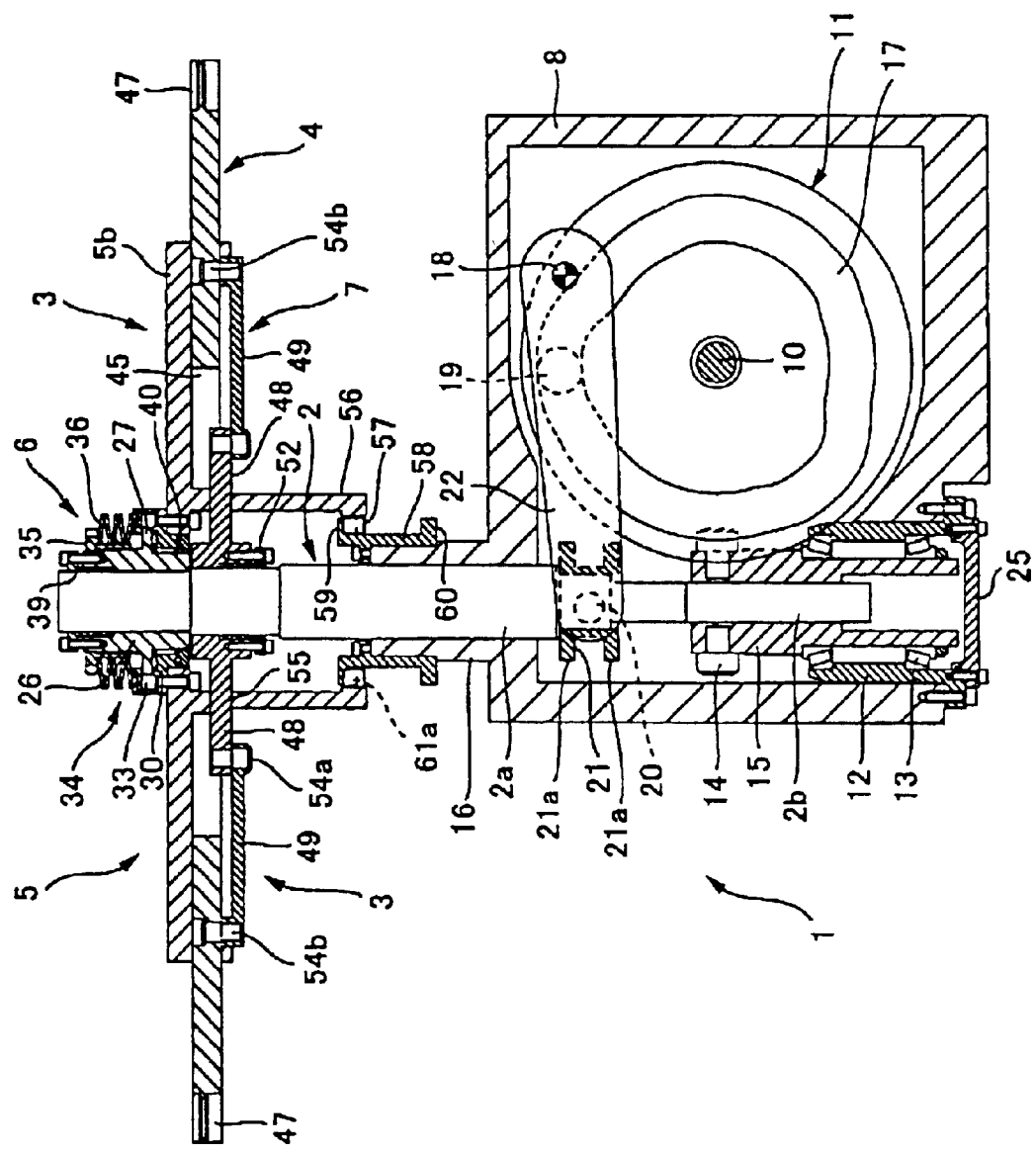
FIG. 5 is a side sectional view of the automatic tool-exchanging apparatus shown in FIG. 1.
Figure 6:
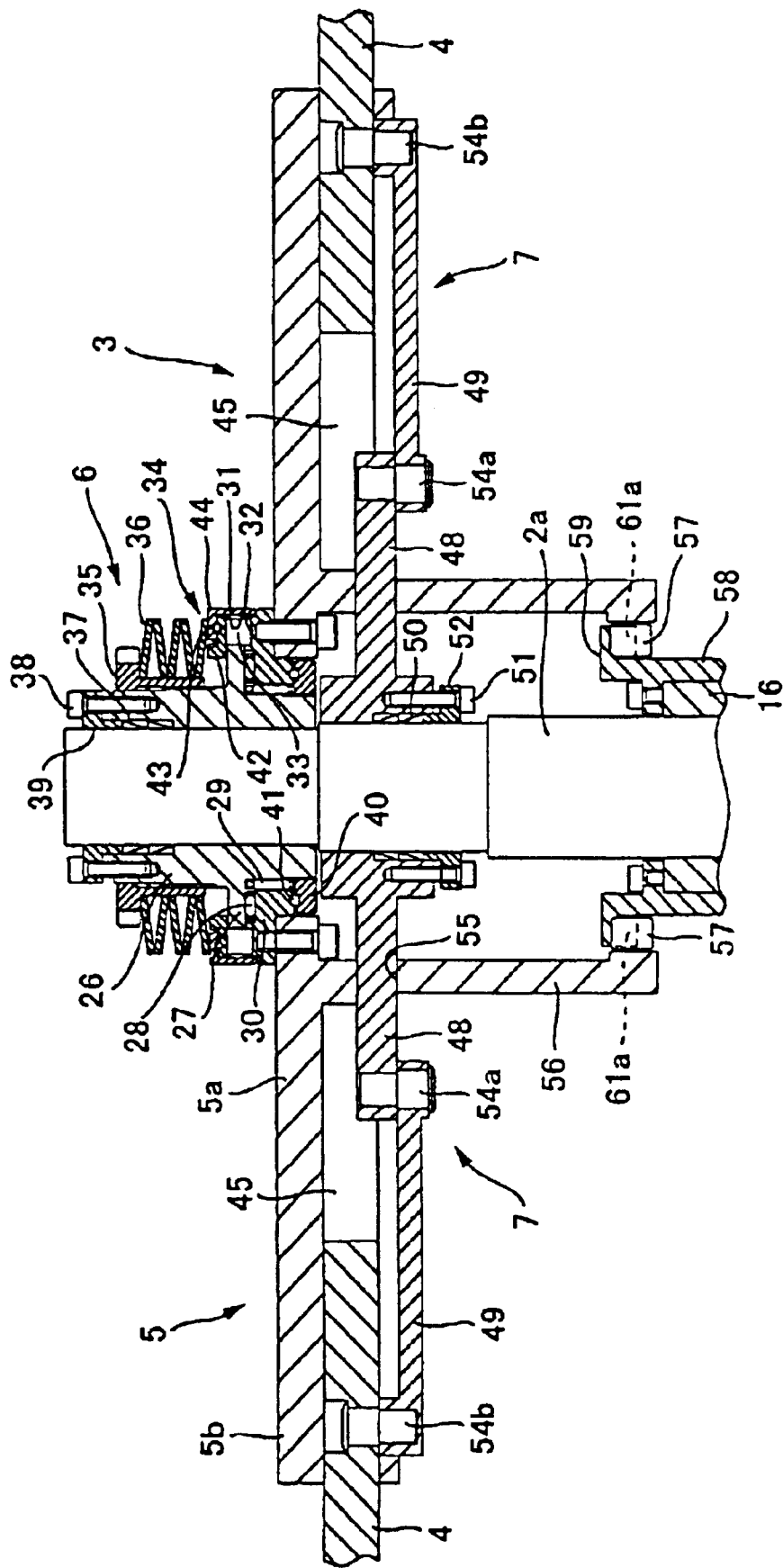
FIG. 6 is an enlarged side sectional view of the periphery of an arm of the automatic tool-exchanging apparatus shown in FIG. 1.
Figure 7:
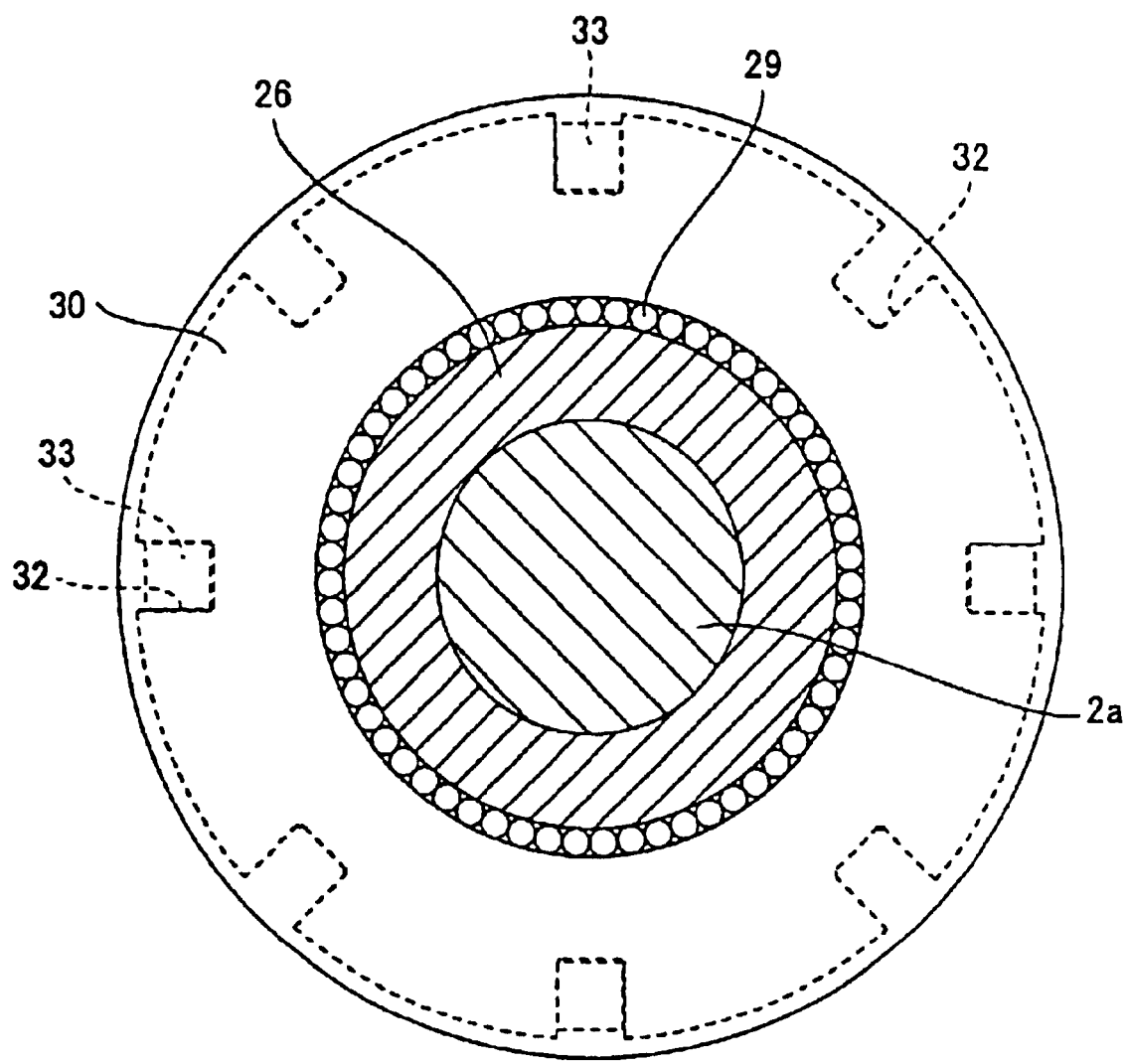
FIG. 7 is an enlarged plan view of a clutch applied to the automatic tool-exchanging apparatus shown in FIG. 1.

First, referring to FIG. 3 and FIG. 4, a driving mechanism for driving the arm-driving shaft 2 will briefly be explained. Inside a housing 8, there are mainly provided: an input shaft 10; a roller gear cam 11; a cylindrical turret 15; the arm-driving shaft 2; a lifting/lowering grooved cam 17; and a lifting/lowering arm 22. Both ends of the input shaft 10 are rotatably supported in the housing 8 by bearings 9, and the input shaft 10 is rotatingly driven in one direction by a driving source such as a motor not shown. The roller gear cam 11 is provided on the input shaft 10, is integrally rotated therewith, and outputs a required rotational movement from the axial rotation of the input shaft 10. The cylindrical turret 15 is rotatably supported in a hollow cylindrical member 12 attached to the housing 8 via bearings 13, and is engaged to the roller gear cam 11 via rotating cam followers 14. The top end 2a of the arm-driving shaft 2 is rotatably and slidably inserted in a cylindrical guide portion 16 which is formed on the housing 8 to protrude outwardly therefrom. The bottom end 2b of the arm-driving shaft 2 is inserted into the turret 15; the bottom end 2b engages with the turret 15 in the rotating direction and is spline-fit slidably in the axial direction. The lifting/lowering grooved cam 17 is formed on one end surface of the roller gear cam 11 and outputs a required lifting/lowering movement from the axial rotation of the input shaft 10. The lifting/lowering arm 22 is supported in a swinging manner in the housing 8 via a supporting pin 18 and engages the lifting/lowering grooved cam 17 via a first lifting/lowering cam follower 19, and the second lifting/lowering cam follower 20 is engaged to an annular engagement 21 formed on the arm-driving shaft 2.

In the example shown, four of the rotating cam followers 14 are rotatably attached on the turret 15 along its rotating direction at equal intervals. The spline engagement between the turret 15 and the bottom end 2b of the arm-driving shaft 2 is structured so that the contour shapes of the inner peripheral surface of the turret 15 and the outer peripheral surface of the bottom end 2b of the arm-driving shaft 2 both have a square shape. The first and second lifting/lowering cam followers 19, 20 are attached rotatably to the lifting/lowering arm 22. The annular engagement 21 of the arm-driving shaft 2 is structured of a pair of flanges 21a which sandwiches the second lifting/lowering cam follower 20. Further, on an opening where one of the bearings 9a is attached to support one end of the input shaft 10, there is provided a shaft end cap 23 to seal the opening in a liquid-tight manner. On the other hand, on an opening for attaching the other bearings 9b to support the other end of the input shaft 10 while making the shaft 10 protrude outwardly from the housing 8, there is provided a ring-shaped cap 24 which allows rotation of the input shaft 10 while sealing the opening in a liquid-tight manner.

Further, also on an opening for attaching the bearings 13 in the hollow cylindrical member 12, there is provided a sealing cap 25 to seal the opening in a liquid-tight manner. Then, the turret 15 rotated by the roller gear cam 11 rotatingly drives the arm-driving shaft 2 which is spline engaged thereto, and drives the arm 3 attached to the arm-driving shaft 2 to rotate. Further, the lifting/lowering arm 22 which is swung by the lifting/lowering grooved cam 17 makes the arm-driving shaft 2, which is spline-engaged to the turret 15, slide in respect to the turret 15 and the cylindrical guide portion 16, to liftingly/loweringly drive the arm 3 attached to the arm-driving shaft 2. The annular engagement 21 of the arm-driving shaft 2 can rotate in a state sandwiching the second lifting/lowering cam follower 20 of the lifting/lowering arm 22, and in this way, the arm-driving shaft 2 may be made to slide by the lifting/ lowering arm 22 without obstructing the rotation of the arm-driving shaft 2.

Next, referring to FIG. 5 through FIGS. 8A–8D, the clutch 6 which generates relative rotation between the arm support 5 and the arm-driving shaft 2 is described. The clutch 6 mainly comprises: a hollow cylindrical input boss 26; a ring-shaped output plate 30; four clutch rollers 33; an annular cover 34; and a spring 36. The hollow cylindrical input boss 26 is provided coaxially and integrally on the arm-driving shaft 2. The ring shaped output plate 30 is coaxially arranged with the arm-driving shaft 2 in a manner overlapping the flange 27 of the input boss 26, and is provided to be relatively rotatable in respect to the input boss 26 via a thrust bearing 28 and a radial bearing 29. The four clutch rollers 33 are arranged in every other one of eight roller pockets 31, which are provided at 45° intervals on the peripheral edge of the flange 27 of the input boss 26 along its circumferential direction; thus, the rollers 33 are arranged at 90° intervals. Further, the rollers 33 are detachably engaged to engaging grooves 32 formed on the output plate 30, and can roll and move on the surface of the output plate 30 when detached from the engaging grooves 32. The annular cover 34 is provided coaxially with the arm-driving shaft 2 in a manner overlapping the flange 27 of the input boss 26 from the opposite side of the output plate 30, and it keeps the clutch rollers 33 in the roller pockets 31. The spring 36 is provided between the cover 34 and a hollow cylindrical bolt 35 for adjusting the spring force and screwed to the input boss 26. The spring 36 biases the cover 34 towards the output plate 30 in order to keep the clutch rollers 33 and the engagement grooves 32 engaged, though this engagement may be released.

In detail, the input boss 26 is integrally and rotatably fixed to the arm-driving shaft 2 by pushing an annular fastening element 37, which is to be placed between the arm-driving shaft 2, in between the input boss 26 and the arm-driving shaft 2 by a press-in member 39 which is fastened-in by a bolt 38 at one end of the input boss 26. The output plate 30 is rotatably supported via roller bearings 41 on a locknut 40 which is screwed to the other end of the input boss 26 on the opposite side to the press-in member 39. The cover 34 comprises: an annular upper cover plate 42 covering the roller pockets 31 from above; and an annular side cover plate 44 provided overlapping the upper cover plate 42 via a roller bearing 43, and closing-in the roller pockets 31 from the outer side of the flange 27. Further, as in the example shown, a Belleville spring is used as the spring 36.

Figure 8A:
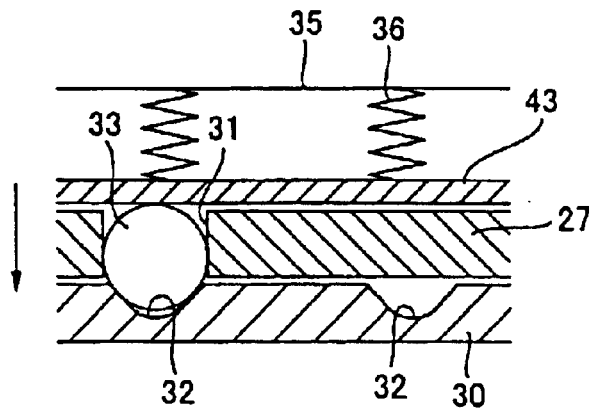
FIG. 8 is an explanatory view explaining an engaging/disengaging operation of a clutch applied to the automatic tool-exchanging apparatus shown in FIG. 1.
Figure 8B:
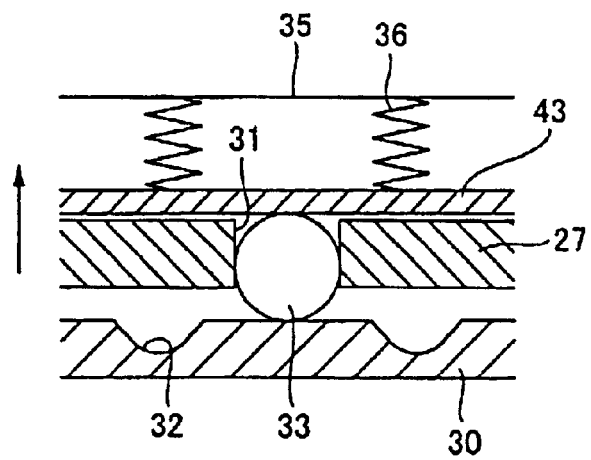
Figure 8C:
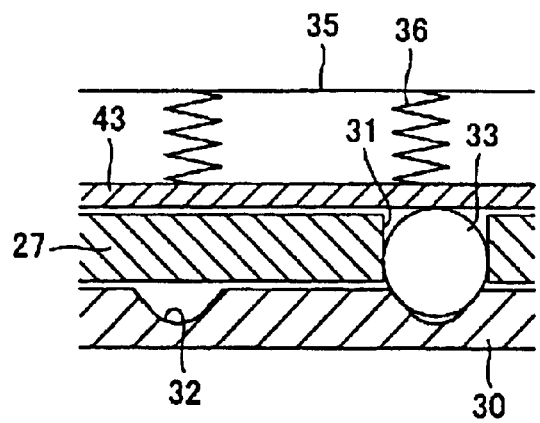

With the clutch 6 shown in FIG. 8, when the clutch rollers 33 are engaged with the engaging grooves 32 by biasing force of the spring 36, the rotation of the input boss 26, which rotates integrally with the arm-driving shaft 2, is transmitted to the output plate 30 to integrally rotate both the input boss 26 and the output plate 30. On the other hand, when the clutch rollers 33 detach from the engaging grooves 32 against the biasing force of the spring 36, the clutch rollers 33 will roll on the surface of the output plate 30, and even if the input boss 26 rotates, such rotation will not be transmitted to the output plate 30. Therefore, there is generated a relative rotation of the input boss 26 and the arm-driving shaft 2 in respect to the output plate 30 to which rotation is not transmitted. Further, when the clutch rollers 33 reach the adjacent empty engaging grooves 32 and engage such engaging grooves 32 by biasing force of the spring 36, both the output plate 30 and the input boss 26 will be made to integrally rotate again.

Next, explanation will be made of the arm 3, which comprises the grip arms 4 and the arm support 5 and which is moved in an extending/contracting manner. In order to move the arm support 5 integrally with the output plate 30, the base end 5a of the arm support 5 is attached to the output plate 30, and, in between the base end 5a and an elongated end 5b which extends radially outwardly from the arm-driving shaft 2, there is provided a slide groove 45 formed straight in the extending direction. The grip arms 4 are slidably supported in the arm support 5 via slide projections 46 which engage the slide grooves 45, so that the grip arms 4 slide in/out radially to/from the elongated end 5b of the arm support 5. At a tip of each grip arm 4 is provided a U shaped grip 47 which detachably holds a tool.

By engagement of the slide groove 45 and the slide projection 46, the grip arms 4 are made to linearly and reciprocatingly move with respect to the arm support 5. Accordingly, the arm 3 is made to move to extend/contract. In the example shown, the pair of arms 3 is projected outwardly from both sides of the arm-driving shaft 2, taking the shaft 2 as the center.

The extending/contracting movement of the arm 3 is obtained by the above-mentioned clutch 6 generating a relative rotation of the arm-driving shaft 2 in respect to the output plate 30 to which rotation is not transmitted, and also, in respect to the arm support 5. In order to do so, there are provided links 7 in between the arm-driving shaft 2 and the respective grip arms 4, to transmit the relative rotation of the arm-driving shaft 2 in respect to the arm support 5. As shown, the link 7 comprises: a crank arm 48 which is coaxially and integrally provided in respect to the arm-driving shaft 2 directly below the input boss 26; and a connecting rod 49 which is rotatably connected at both ends to a horizontally extending end of the crank arm 48 and to the grip arm 4 via pins 54a and 54b.

The crank arm 48, as similar to an input boss 26, is integrally and rotatably fixed to the arm-driving shaft 2 by pushing an annular fastening element 50, which is to be placed between the arm-driving shaft 2, in between the crank arm 48 and the arm-driving shaft 2 by a pressing member 52 which is fastened-in by a bolt 51 at one end of the crank arm 48. The pin 54b which connects the connecting rod 49 and the grip arm 4 is slidably engaged in a slit 53 formed in the arm support 5 along the sliding direction of the grip arm 4, in order to guide the movement of the grip arm 4. By relative rotation of the crank arm 48 in respect to the arm support 5, the link 7 makes the grip arm 4 slidingly move in respect to the arm support 5 via the connecting rod 49.

Therefore, in relation with the clutch 6, when the output plate 30, namely, the arm support 5 and the arm-driving shaft 2 both connectedly and integrally rotate, the crank arm 48 also rotates therewith, and therefore, the grip arm 4 is not slidingly moved. On the other hand, with the output plate 30 and the arm-driving shaft 2 separated and a relative rotation is generated therebetween, the crank arm 48 relatively rotates in respect to the arm support 5, and thus the grip arm 4 is slidingly moved.

Figure 9:
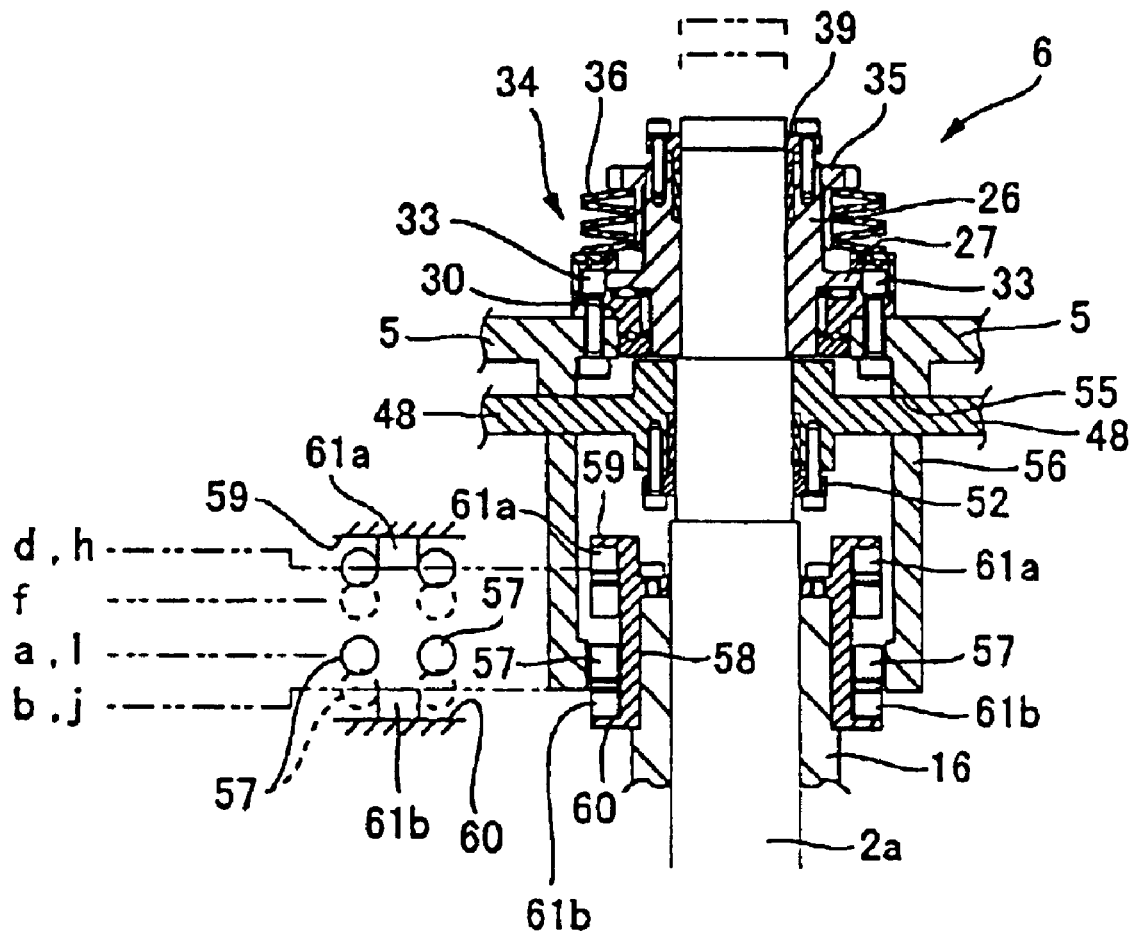
FIG. 9 is an explanatory diagram explaining movements of the operational mechanism for engaging/disengaging the clutch applied to the automatic tool-exchanging apparatus shown in FIG. 1.

Further, referring to FIG. 9, explanation will be made of an operation mechanism of the clutch 6 to connect and to separate the arm support 5 and the arm-driving shaft 2. The operation mechanism utilizes the lifting/lowering movement of the arm-driving shaft 2. In the arm support 5, there is provided a pair of stopping rollers 57, as engagement members for stopping, at the lower end of a cylindrical portion 56 which is made to hang downwards and to comprise a notch 55 for allowing rotation of the crank arm 48 while housing the base end of the crank arm 48. Further, there is provided a ring member 58 on the cylindrical guide portion 16 of the housing 8. Below an upper brim 59 and above a lower brim 60 of the ring member 58 are respectively provided stopping projections 61a and 61b, as stoppers, for detachably engaging the blocking rollers 57 which move with the lifting/lowering movement of the arm-driving shaft 2. The stopping projections 61a and 61b are provided at two points on the ring member 58 at an interval of 180° in the circumferential direction.

The stopping engagement members are also provided at two points corresponding to the stopping projections 61a and 61b. Each of the stopping engagement members is constructed by a pair of stopping rollers 57 arranged in parallel in the circumferential direction of the cylindrical portion 56 with an interval provided therebetween. The engagement members respectively engage the stopping projections 61a, 61b in the lifting/lowering direction of the arm-driving shaft 2, and sandwich the projections 61a, 61b from both sides of the rotation direction of the arm-driving shaft 2. In this way, the arm support 5 is positioned in view of the housing 8 and stopped via the cylindrical portion 56. When the arm-driving shaft 2 is rotated with the arm support 5 in a halted state by engagement of the stopping rollers 57 and the stopping projections 61a and 61b, the clutch rollers 33 detach from the engaging grooves 32 against the force of the spring 36, and the connection of the arm support 5 and the arm-driving shaft 2 by the clutch 6 is separated. Accordingly, separation of the arm support 5 and the arm-driving shaft 2 is achieved.

Figure 10:
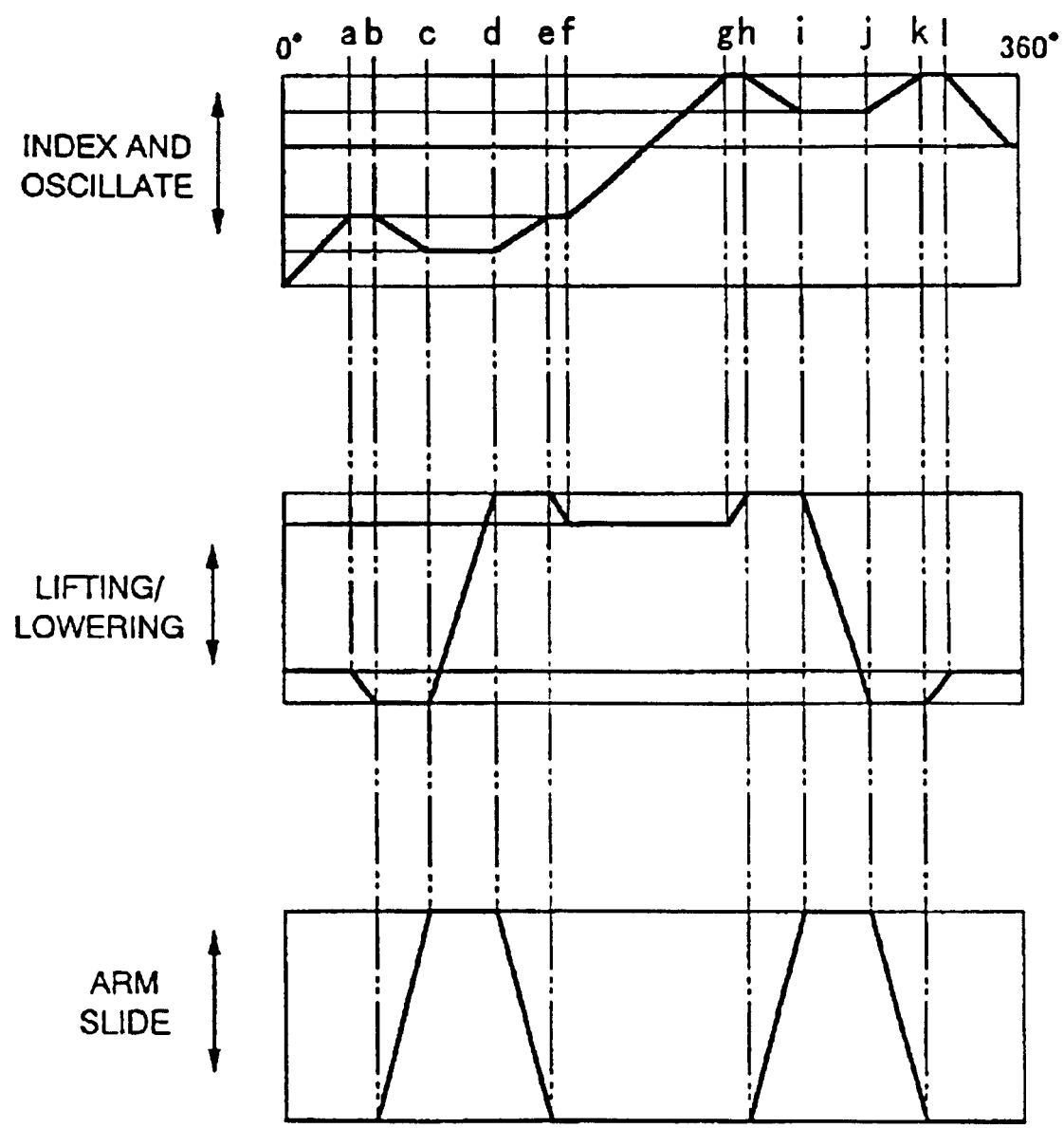
FIG. 10 is an operation diagram explaining one example of operations in the automatic tool-exchanging apparatus shown in FIG. 1.

Next, the operation of the automatic tool-exchanging apparatus 1 according to the present embodiment is described referring to the operation diagram of FIG. 10, and furthermore based on FIG. 11 to FIG. 14. As described above, as shown in FIG. 11, the arm-driving shaft 2 is driven to rotate appropriately by the roller gear cam 11 and the turret 15 during one rotation (0° to 360°) of the input shaft 10. Also, the shaft 2 is appropriately driven in a lifting/lowering manner by the lifting/lowering grooved cam 17 and the lifting/lowering arm 22.

Figure 11:
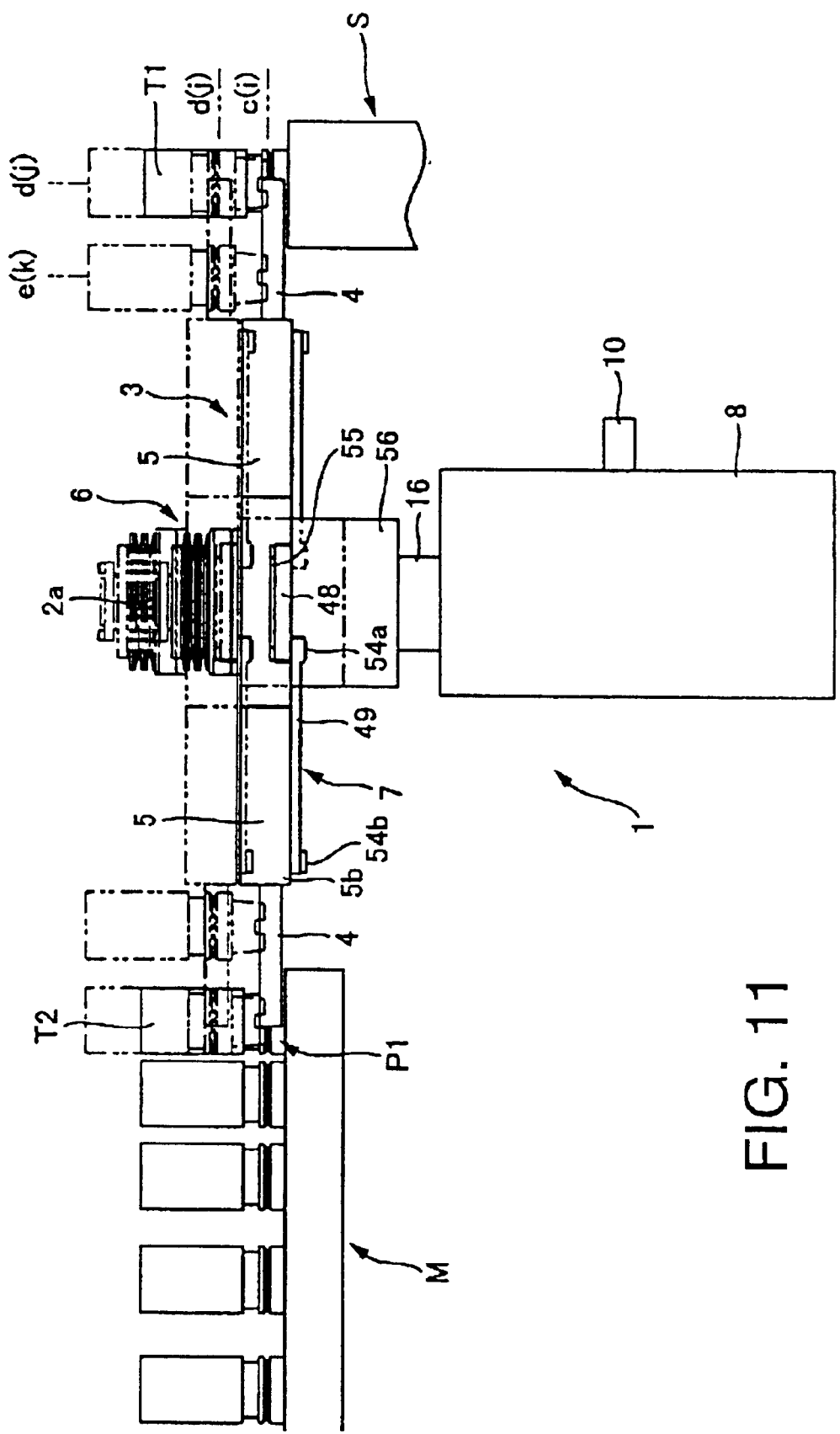
FIG. 11 is a side view of the automatic tool-exchanging apparatus shown in FIG. 1 explaining the tool-exchanging movements according to the operation diagram shown in FIG. 10.
Figure 12:
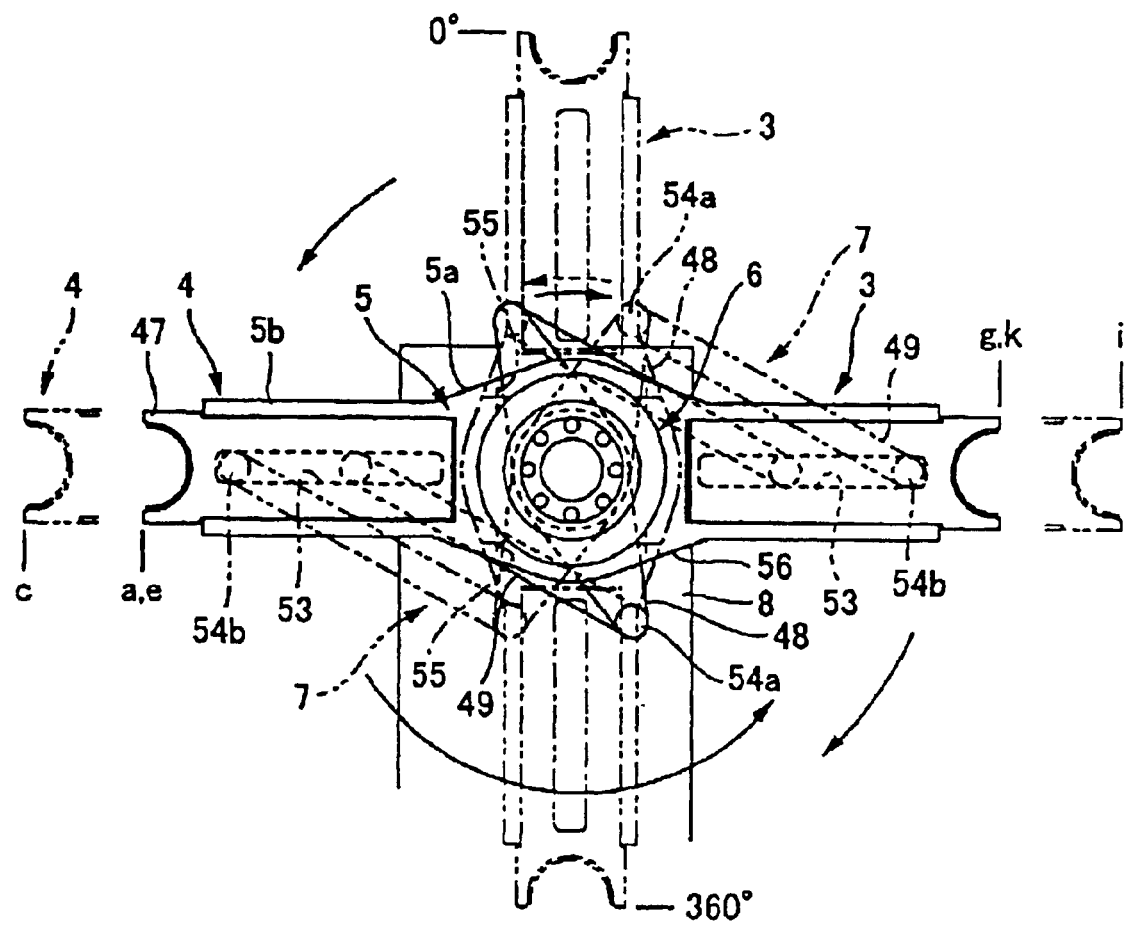
FIG. 12 is a plan view of the automatic tool-exchanging apparatus shown in FIG. 1 explaining the tool exchange movement according to the operation diagram shown in FIG. 10.
Figure 13:
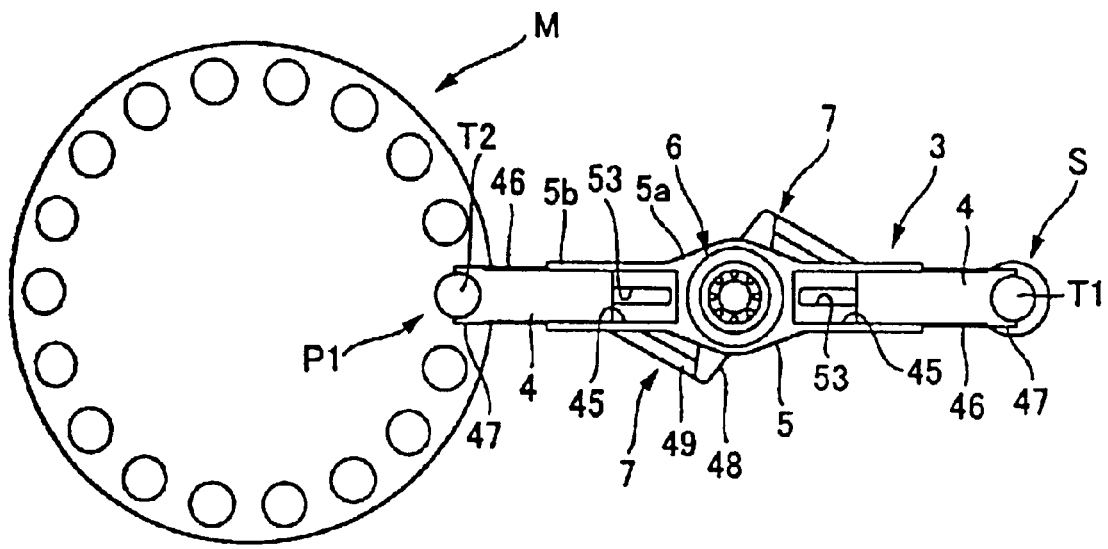
FIG. 13 is a schematic plan view showing a tool-exchanging state of the automatic tool-exchanging apparatus shown in FIG. 1.
Figure 14:
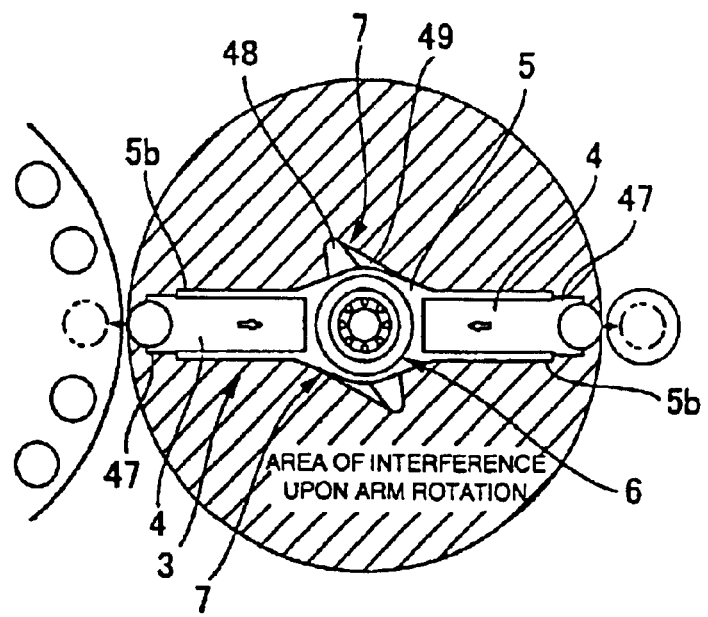
FIG. 14 is a schematic plan view showing an arm-rotating region of the automatic tool-exchanging apparatus shown in FIG. 1.

In detail, in an initial state where the rotational angle of the input shaft 10 as 0°, as shown in FIG. 11 and FIG. 12, the arm 3 is arranged to stop between a tool standby position P1 of a tool magazine M where the exchange tool T2 is positioned and a main shaft S of a machining center where the exchange tool T1 is positioned, and in a position perpendicular to the relation of arrangement of the above components. Also, the position of the arm-driving shaft 2 in the lifting/lowering direction is set (1) at a position slightly higher than the stopping projection 61b in a state the stopping rollers 57 of the cylindrical portion 56 provided on the arm support 5 are detached from the stopping projections 61b at the lower brim 60 side of the ring member 58 provided on the cylindrical guide portion 16, and (2) at a position 90° away from the stopping projection 61b. At this time, the grip arm 4 is drawn into the arm support 5, and the arm 3 is in a contracted state.

In the (0°-a) period, while maintaining the lifted position and the contracted state of the arm 3, the arm-driving shaft 2 is rotationally driven, for example, 90° to the left by the roller gear cam 11 etc. Accordingly, the arm 3 is turned to a position where each grip 47 of the arm 3 faces the tool standby position P1 and the main shaft S respectively. By the rotating movement of the arm 3, the stopping rollers 57, forming a set of two, move to a position directly above the stopping projection 61b at the lower brim 60 side.

In the (a-b) period, while maintaining the turned position and the contracted state of the arm 3, the arm-driving shaft 2 is moved (i.e., lowered), by the lifting/lowering grooved cam 17 etc., in the lifting/lowering direction to a height where the two stopping rollers 57 sandwich and engage both sides of the stopping projections 60b at the lower brim 60 side. In this way, preparation is made for separation of the arm support 5 and the arm-driving shaft 2 by the clutch 6.

In the (b-c) period, the arm-driving shaft 2 is rotated (in the example shown, rotated rightward) while maintaining a state at a height in the lifting/lowering direction to keep engagement between the stopping rollers 57 and the stopping projection 61b and keep the arm support 5 from moving. In this way, the clutch rollers 33 move out of the engaging grooves 32 in the clutch 6 so that the arm support 5 and the arm-driving shaft 2 are separated and relative rotation is generated between the shaft 2 and the support 5. In this way, the crank arm 48 relatively rotates to the right in respect to the arm support 5 which is kept from moving, and the crank arm 48 slidingly moves the grip arm 4 in a direction projecting from the elongated end 5b of the support arm 5 via the connecting rod 49. Accordingly, the arm 3 is extended. With this extending movement, the grips 47 move near the exchange tools T1, T2 placed respectively in the tool stand by position P1 and the main shaft S from the horizontal direction to hold the tools simultaneously.

In the (c-d) period, in order to lift the exchange tools T1, T2, which are now held by the respective grips 47, to a position at sufficient height to pull them out from the tool magazine M and the main shaft S, the arm-driving shaft 2 is moved (i.e., lifted) in the lifting/lowering direction to a height so that the stopping rollers 57 are moved from the stopping projection 61b on the lower brim 60 side to a position directly above thereof to engage the stopping projections 61a at the upper brim 59 side. In this way, preparation is made for separation to be carried out by the clutch 6 to make the arm 3 contract.

In the (d-e) period, the arm-driving shaft 2 is rotated (in the example shown, rotated leftward) while maintaining a state at a height in the lifting/lowering direction to keep the engagement between the stopping rollers 57 and the stopping projection 61a at the upper brim 59 side. In this way, the arm support 5 and the arm-driving shaft 2 are separated by the clutch 6, and a relative rotation is generated between the support 5 and the shaft 2. In this way, the crank arm 48 relatively rotates to the left, which is the opposite direction of the extending movement of the arm 3, and the crank arm 48 slidingly moves the grip arm 4 to be drawn inside the support arm 5 via the connecting rod 49. Accordingly, the arm 3 is contracted. With this contracting movement, the turning radius of the entire arm 3 including the grips 47 holding the exchanging tools T1, T2 is shortened. In this way, interference of the arm 3 with the tool magazine M or the shaft S when the arm 3 rotates may be prevented.

In the (e-f) period, the arm-driving shaft 2 is moved (i.e., lowered) in the lifting/lowering direction to a height slightly lower than the stopping projection 61a where the stopping rollers 57 detach from the stopping projection 61a at the upper brim 59 side, while in a state maintaining the turned position and the contracting state of the arm 3. In this way, preparation is made to connect the arm-driving shaft 2 and the arm support 5 so that they are integrally rotated by the clutch 6.

In the (f-g) period, the arm-driving shaft 2 is rotated in a state maintaining the position in the lifting/lowering direction and the contracted state of the arm 3, and the arm 3 is turned 180° to the left. Thus, the exchange tool T2 taken out of the tool magazine M is conveyed to the main shaft S, and the exchange tool T1 taken out of the main shaft S is conveyed to the tool magazine M. At this time, by the rotating movement of the arm 3, the stopping rollers 57 move directly beneath the stopping projections 61 at the upper brim 59 side.

In the (g-h) period, the arm-driving shaft 2 is moved (i.e., raised) in the lifting/lowering direction to a height where the stopping rollers 57 engage the stopping projection 61a at the upper brim 59 side, while in a state maintaining the position in the rotating direction and the contracted state of the arm 3. In this way, preparation is made for disconnecting the arm support 5 and the arm-driving shaft 2 by the clutch 6.

In the (h-i) period, the arm-driving shaft 2 is rotated (in the example shown, rotated rightward) in a state maintaining the lifted height. At this time, by disconnection according to the clutch 6, the crank arm 48 is relatively rotated to the right in respect to the arm support 5, and the grip arm 4 is slidingly moved to project out from the support arm 5. Accordingly, the arm 3 is extended. With this extending movement, the exchanging tools T1, T2 held by the respective grips 47 may simultaneously be handed to the tool magazine M and the main shaft S respectively.

In the (i-j) period, in order to move the grips 47 in the lifting/lowering direction to a position at a sufficient height in respect to the height of the exchange tools T1, T2 so as to retract the grips 47 from the exchange tools T1, T2 which have been handed to the tool magazine M and the main shaft S, the arm-driving shaft 2 is moved (i.e., lowered) in the lifting/lowering direction so that the stopping rollers 57 are moved away from the stopping projections 61a at the upper brim 59 side and to a position where they again engage the stopping projections 61b at the lower brim 60 side directly there below.

In the (j-k) period, the arm-driving shaft 2 is rotated (in the example shown, rotated leftward) in a state maintaining its height in the lifting/lowering direction to keep the engagement of the stopping rollers 57 and the stopping projection 61b at the lower brim 60 side. In this way, the clutch 6 is disconnected, and the grip arm 4 is slidably moved in a direction to be drawn in to the support arm 5. Accordingly, the arm 3 is contracted. With this contracting movement, the turning radius of the entire arm 3 including the grips 47 is shortened, and interference of the arm 3 with the tool magazine M or the shaft S when it rotates is prevented.

In the (k-l) period, the arm-driving shaft 2 is moved (i.e., raised) in the lifting/lowering direction to a height slightly higher than the stopping projections 61b where the stopping rollers 57 detach from the stopping projections 61b at the lower brim 60 side, in a state maintaining the position in the rotating direction and the contracted state of the arm 3. In this way, preparation is made to connect the arm-driving shaft 2 and the arm support 5 so that they are integrally rotated by the clutch 6.

In the (1-360° (0°)) period, the arm-driving shaft 2 is rotated in a state maintaining its position in the lifting/lowering direction and the contracted state of the arm 3, and the arm 3 is turned 90° to the right. Thus, the positions of the grips 47 are switched, and the arm 3 is returned to the above-mentioned initial state. In this way, with one rotation of the input shaft 10, the exchange tools T1, T2 may be automatically exchanged. Further, cam profiles corresponding to the indexing oscillation and the lifting/lowering movement shown in FIG. 10 are provided respectively for the roller gear cam 11 for rotatingly driving the turret 15 which makes the arm-driving shaft 2 rotate, and the lifting/lowering grooved cam 17 for making the lifting/lowering arm 22, which lifts the arm-driving shaft 2, perform lifting movement.

In regard to the automatic tool-exchanging apparatus 1 according to this embodiment as described above, it is possible to extend/contract the arm 3 through a rational and simple structure comprising only the clutch 6 and the links 7, by: structuring the arm 3 by the arm support 5 and the grip arms 4; generating integral rotation and/or relative rotation with connection/disconnection movements of the support arm 5 and the arm-driving shaft 2 by the clutch 6; and utilizing the relative rotation therebetween to make the link 7 move the grip arm 4.

The mechanisms necessary to extend/contract the arm 3 are only the clutch 6 and the link 7, and thus, power loss is small. Further, especially, since the clutch 6 and the link 7 are provided in between the arm-driving shaft 2 and the arm support 5 and/or the grip arm 4, the increase of rotational inertia may be suppressed to a small amount and precision of the stopping position of the arm 3 may be increased. Thus, high-speed operation of the apparatus may be achieved. Especially in this embodiment, since the clutch 6 and the crank arm 48 constructing the link 7 are coaxially provided with the arm-driving shaft 2, only the connecting rod 49 influences the increase of the rotational inertia. Accordingly, the operation precision of the arm 3 may be increased and high-speed operation of the apparatus is made possible.

Further, since the extending/contracting movement of the arm 3 utilizes rotation in reciprocating directions of the arm-driving shaft 2 which makes the arm 3 rotate, a desired reciprocation can be ensured with high precision by a simple change of the cam profile of the roller gear cam 11. Further, since the connecting/disconnecting movement of the clutch 6 utilizes reciprocating movements in the axial direction of the arm-driving shaft 2 which can lift the arm 3, a desired connecting/disconnecting movement can be ensured with high precision by a simple change of the cam profile of the lifting/lowering grooved cam 17.

In this embodiment, identification of the position of the arm 3 in the rotating direction can be ensured with high precision with the roller gear cam 11. Further, in this embodiment, when transferring the exchange tools T1, T2 between the tool magazine M and the main shaft S, the clutch 6 is disconnected and the grip arm 4 is made to slide. Since the arm support 5 may be positioned in a locked state utilizing the stopping projections 61a and 61b provided on the housing 8, the arm 3 does not float with the disconnecting movement of the clutch 6 and/or the sliding of the grip arm 4. Therefore, the position of the arm 3 does not deviate from the position in respect to the tool magazine M and the main shaft S, and a stable tool-exchanging movement may be ensured at high precision. Further, since the extending/contracting movement of the arm 3 is a linear reciprocating movement of the grip arm 4 in respect to the arm support 5, directional stability of the arm 3 in respect to the positions of the tool magazine M and the main shaft S may be highly ensured, and the exchange tools T1 and T2 may be appropriately attached/detached.

Figure 15:
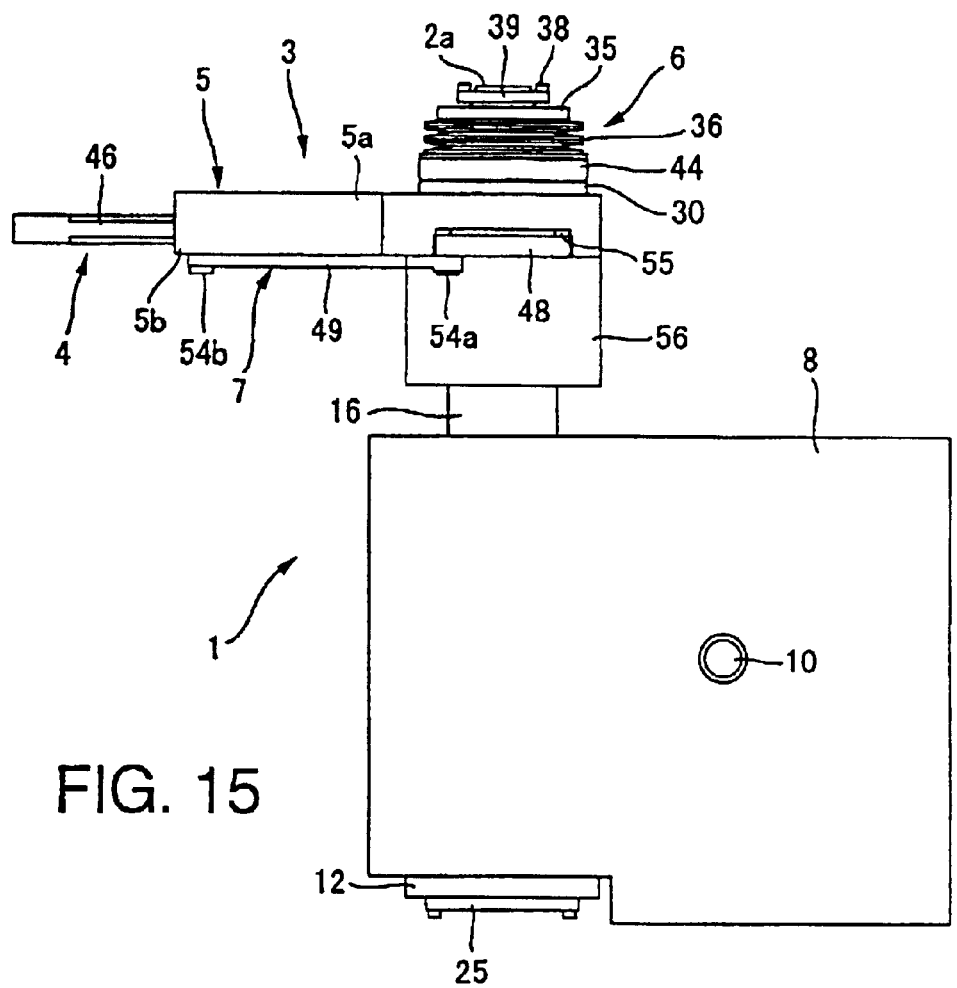
FIG. 15 is a side view showing a modification of an automatic tool-exchanging apparatus according to the present invention.
Figure 16:
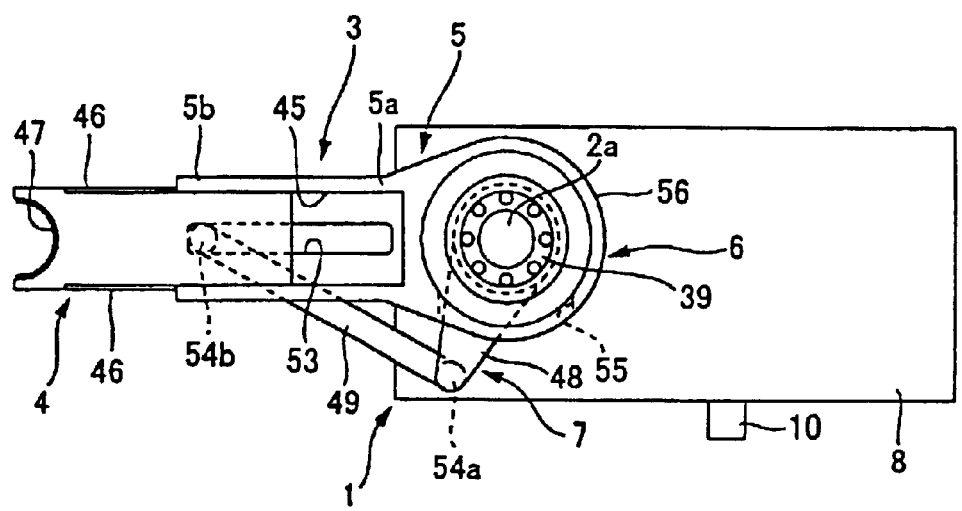
FIG. 16 is a plan view of the automatic tool-exchanging apparatus shown in FIG. 15.
Figure 17:
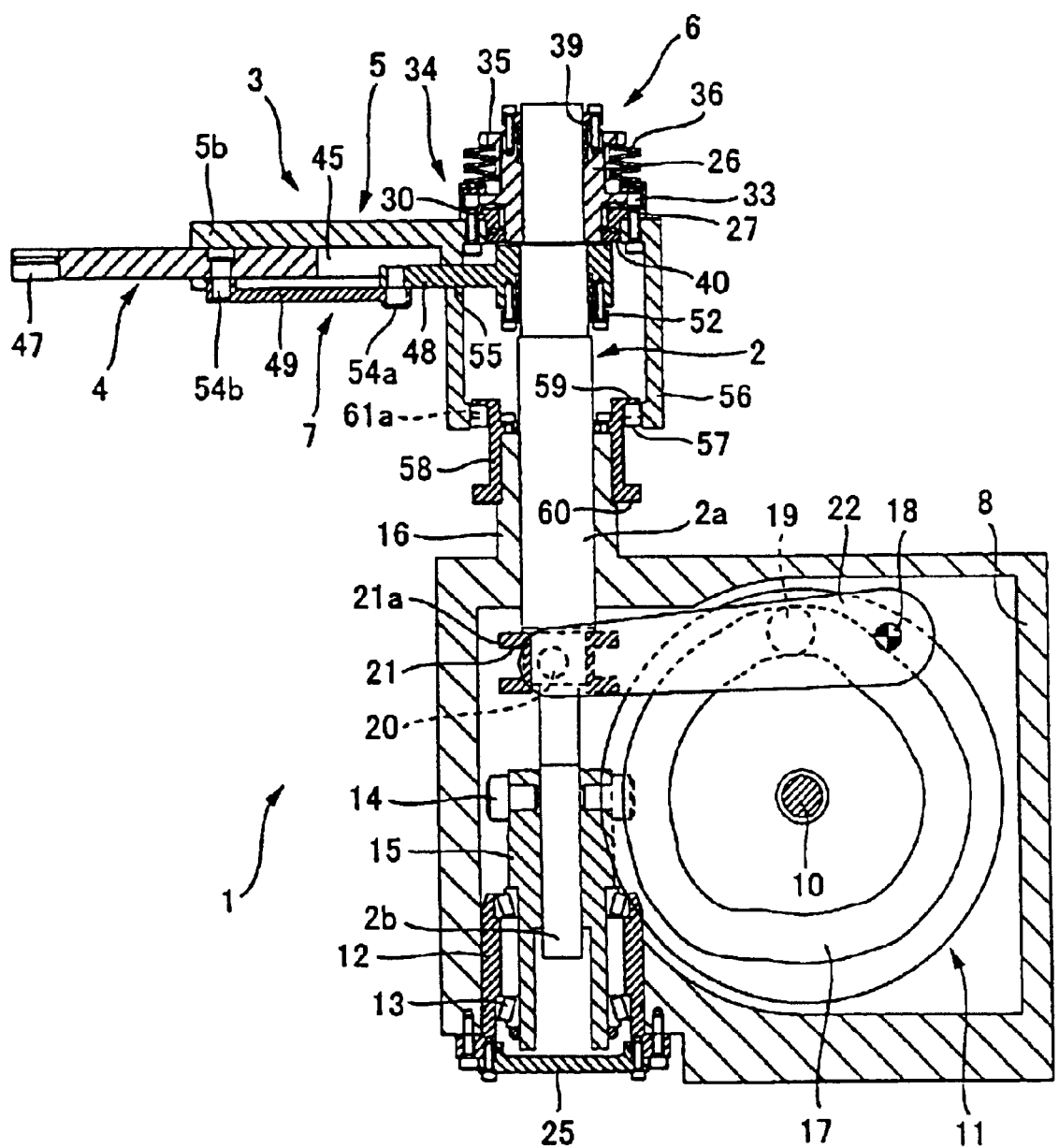
FIG. 17 is a side sectional view of the automatic tool-exchanging apparatus shown in FIG. 15.

In FIG. 15–FIG. 17, there are shown modifications of the above embodiment. An automatic tool-exchanging apparatus 1 according to this modification is approximately the same as the above embodiment, except that the arm 3 is formed so as to project out at one side of the arm-driving shaft 2. It is needless to say that with an automatic tool-exchanging apparatus 1 comprising such a cantilever type arm 3, a similar effect as the above embodiment may be obtained.

With the automatic tool-exchanging apparatus according to the present invention, the arm may be moved to extend/contract with a rational and simple structure, and a high-speed operation of the apparatus that is naturally obtained by making the turning radius small may be realized.

Although the preferred embodiment of the present invention has been described in detail, it should be understood that various changes, substitutions and alterations can be made therein without departing from spirit and scope of the inventions as defined by the appended claims.

What is claimed is:

1. An automatic tool-exchanging apparatus comprising:
   an arm-driving shaft capable of being driven to rotate;
   an arm provided on said arm-driving shaft and capable of being rotated, said arm having at least one grip arm capable of being moved to linearly extend and contract relative to the shaft axis, and comprising
      said at least one grip arm being for attachably or detachably holding a tool, and
      an arm support movably supporting said at least one grip arm;
   a clutch provided between said arm support and said arm-driving shaft, said clutch capable of
      connecting said arm support and said arm-driving shaft to make them rotate integrally, and
      disconnecting said arm support and said arm-driving shaft to generate a relative rotation therebetween; and
   a link provided between said grip arm and said arm-driving shaft, said link capable of transmitting said relative rotation of said arm-driving shaft in respect to said arm support to make said grip arm perform said extension and contraction.

2. An automatic tool-exchanging apparatus as claimed in claim 1, wherein:
   said arm-driving shaft is capable of being driven to rotate back and forth;
   said clutch is capable of generating a back-and-forth relative rotation between said arm support and said arm-driving shaft; and
   said link transmits said back-and-forth relative rotation to said at least one grip arm to make said at least one grip arm perform said extension and contraction.

3. An automatic tool-exchanging apparatus as claimed in claim 1, wherein:
   said arm-driving shaft is capable of being driven to reciprocate in the axial direction thereof;
   said arm support is made to detachably engage a stopper according to said reciprocation in the axial direction of said arm-driving shaft, said stopper being capable of preventing the rotation of said arm support; and
   said clutch is disconnected when said arm support engages said stopper.

* * * * *

(12) EX PARTE REEXAMINATION CERTIFICATE (5409th)
United States Patent
Kato

(10) Number: US 6,773,382 C1
(45) Certificate Issued: Jun. 13, 2006

(54) AUTOMATIC TOOL-EXCHANGING APPARATUS

(75) Inventor: Heizaburo Kato, Shizuoka (JP)

(73) Assignee: Sankyo Manufacturing Co., Ltd., Tokyo (JP)

Reexamination Request:
No. 90/007,301, Nov. 15, 2004

Reexamination Certificate for:
Patent No.: 6,773,382
Issued: Aug. 10, 2004
Appl. No.: 10/310,213
Filed: Dec. 5, 2002

(30) Foreign Application Priority Data
Dec. 6, 2001 (JP) ........................... 2001-372880

(51) Int. Cl.
*B23C 3/157* (2006.01)

(52) U.S. Cl. .................... 483/39; 414/744.6; 414/917; 483/38; 483/45; 483/49

(58) Field of Classification Search .............. 294/103.1; 414/744.2, 744.6, 744.8, 917; 483/36, 38, 483/39, 40, 41, 44, 45, 49, 60, 61, 66, 67, 483/902

See application file for complete search history.

(56) References Cited

U.S. PATENT DOCUMENTS

| 4,698,898 A | 10/1987 | Horsch |
| 4,744,596 A | 5/1988 | Hiller et al. |
| 4,833,772 A | 5/1989 | Kobayashi et al. |
| 4,884,332 A | 12/1989 | Ozawa et al. |
| 5,281,194 A * | 1/1994 | Schneider ................. 483/14 |
| 5,620,406 A * | 4/1997 | Bae ............... 483/39 |
| 5,752,905 A | 5/1998 | Yan et al. |
| 6,679,131 B1 * | 1/2004 | Kato ............. 74/53 |
| 2002/0035881 A1 * | 3/2002 | Kato ............. 74/53 |
| 2002/0043126 A1 * | 4/2002 | Kato ............. 74/567 |

FOREIGN PATENT DOCUMENTS

| JP | 63-102851 | 5/1988 |
| JP | 11-099429 | 4/1999 |

OTHER PUBLICATIONS

European Search Report for Patent Application No. EP 02 25 8401; mailed Jul. 5, 2004.

* cited by examiner

*Primary Examiner*—Jimmy G. Foster

(57) ABSTRACT

An automatic tool-exchanging apparatus is provided which extends/contracts an arm with a rational and simple structure and can realize a high-speed operation essentially obtainable by making the arm's turning radius small. The apparatus comprises: an arm-driving shaft for being driven to rotate; an arm provided on the shaft and capable of being rotated, the arm capable of being moved to extend/contract and comprising a grip arm for attaching/detaching a tool, and an arm support movably supporting the grip arm; a clutch between the arm support and the shaft, the clutch for connecting the arm support and the shaft to make them rotate integrally, and disconnecting the arm support and the shaft to generate a relative rotation therebetween; and a link between the grip arm and the shaft, the link for transmitting the relative rotation of the shaft in respect to the arm support to make the grip arm move.

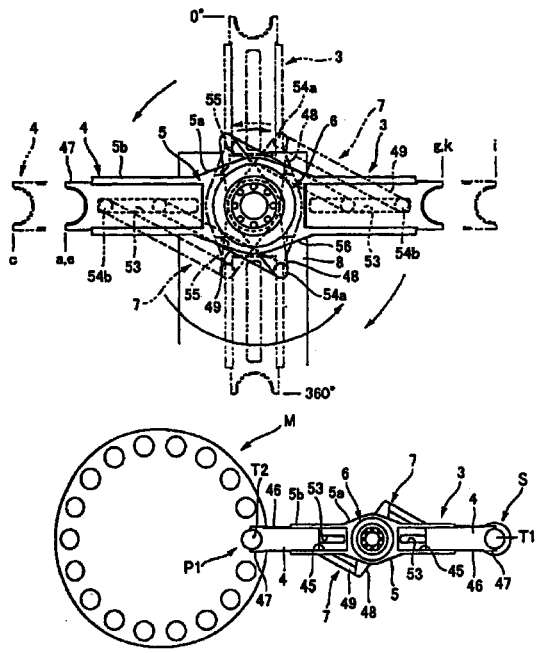

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–3 is confirmed.

\* \* \* \* \*